United States Patent
Minamishin et al.

(10) Patent No.: US 7,319,978 B2
(45) Date of Patent: Jan. 15, 2008

(54) NET SHOPPING METHOD, SYSTEM THEREFOR, AND AUTOMATIC PAYMENT TRANSFER DEVICE

(75) Inventors: Hayato Minamishin, Kawasaki (JP); Tsuyoshi Abe, Kawasaki (JP); Koji Arai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 660 days.

(21) Appl. No.: 09/815,052

(22) Filed: Mar. 23, 2001

(65) Prior Publication Data

US 2002/0062257 A1    May 23, 2002

(30) Foreign Application Priority Data

Nov. 22, 2000  (JP) .............................. 2000-355231

(51) Int. Cl.
 *G06Q 30/00* (2006.01)
(52) U.S. Cl. .......................................... 705/26; 705/64
(58) Field of Classification Search ................ 705/26, 705/64; 455/406, 506
See application file for complete search history.

(56) References Cited

U.S. PATENT DOCUMENTS

| | | | | |
|---|---|---|---|---|
| 4,783,798 | A * | 11/1988 | Leibholz et al. ............. | 713/155 |
| 5,796,093 | A * | 8/1998 | Reichardt et al. ............ | 235/492 |
| 5,917,913 | A * | 6/1999 | Wang ............................ | 705/67 |
| 5,991,749 | A * | 11/1999 | Morrill, Jr. .................... | 705/44 |
| 5,999,827 | A * | 12/1999 | Sudo et al. ................... | 455/564 |
| 6,138,907 | A * | 10/2000 | Mori et al. .................... | 235/379 |
| 6,148,297 | A * | 11/2000 | Swor et al. ..................... | 707/3 |
| 6,149,055 | A * | 11/2000 | Gatto ............................ | 235/379 |
| 6,202,054 | B1 * | 3/2001 | Lawlor et al. ................. | 705/42 |
| 6,282,522 | B1 * | 8/2001 | Davis et al. ................... | 705/41 |
| 6,305,603 | B1 * | 10/2001 | Grunbok et al. ............. | 235/379 |
| 6,327,578 | B1 | 12/2001 | Linchan ........................ | 705/65 |
| 6,415,156 | B1 * | 7/2002 | Stadelmann ................. | 455/466 |

(Continued)

FOREIGN PATENT DOCUMENTS

EP    1 017 030 A2    7/2000

(Continued)

OTHER PUBLICATIONS

Anon., "Comdex UK—Psion Intros Palmtop Banking Software Apr. 24, 1996," Newsbytes, Apr. 24, 1996.*

(Continued)

*Primary Examiner*—Nicholas D. Rosen
(74) *Attorney, Agent, or Firm*—Staas & Halsey LLP

(57) ABSTRACT

The present invention relates to a Net shopping method for performing Net shopping through the Internet with a portable terminal. The user freely makes product selections (Net shopping) at any time and place using a portable terminal 2. When the user proposes to conduct a transaction, transaction proposal information, payee information, and the amount of money are automatically sent from the Net shopping site to the portable terminal 2 and stored in the internal memory 22. Next, the user takes the portable terminal 2 to the automatic payment transfer device 4, connects the portable terminal to the payment transfer device 4, and transfers the internal data to the payment transfer device 4. The user can perform payment transfer operations with the payment transfer device 4 based on the order acceptance data. Thus the payment transfer process can be performed safely and with a simple operation.

19 Claims, 8 Drawing Sheets

U.S. PATENT DOCUMENTS

| | | | |
|---|---|---|---|
| 6,431,439 B1 * | 8/2002 | Suer et al. | 235/380 |
| 6,736,322 B2 * | 5/2004 | Gobburu et al. | 235/462.46 |
| 6,748,367 B1 * | 6/2004 | Lee | 705/66 |
| 6,834,271 B1 * | 12/2004 | Hodgson et al. | 705/72 |
| 6,847,937 B1 * | 1/2005 | Savage et al. | 705/21 |
| 6,848,104 B1 * | 1/2005 | Van Ee et al. | 719/310 |
| 6,910,023 B1 * | 6/2005 | Schibi | 705/64 |
| 6,928,420 B1 * | 8/2005 | Kurihara et al. | 705/64 |
| 6,931,538 B1 * | 8/2005 | Sawaguchi | 713/186 |
| 7,096,003 B2 * | 8/2006 | Joao et al. | 455/406 |
| 2001/0014881 A1 * | 8/2001 | Drummond et al. | 705/43 |
| 2001/0027425 A1 * | 10/2001 | Davies | 705/26 |
| 2001/0042097 A1 * | 11/2001 | Lapine | 709/206 |
| 2001/0048738 A1 * | 12/2001 | Baniak et al. | 379/201.02 |
| 2002/0026426 A1 * | 2/2002 | Bennett | 705/64 |
| 2002/0062281 A1 * | 5/2002 | Singhal | 705/39 |
| 2002/0187779 A1 * | 12/2002 | Freeny, Jr. | 455/422 |
| 2003/0028491 A1 * | 2/2003 | Cooper | 705/64 |
| 2004/0205004 A1 * | 10/2004 | Bahl et al. | 705/26 |
| 2005/0065855 A1 * | 3/2005 | Geller | 705/26 |
| 2005/0086164 A1 * | 4/2005 | Kim et al. | 705/40 |
| 2005/0131824 A1 * | 6/2005 | Drummond et al. | 705/43 |
| 2005/0154649 A1 * | 7/2005 | Jalili | 705/26 |

FOREIGN PATENT DOCUMENTS

| | | |
|---|---|---|
| EP | 1 050 859 A2 * | 11/2000 |
| JP | 4-241065 | 8/1992 |
| JP | 4-306764 | 10/1992 |
| JP | 9-147186 | 6/1997 |
| JP | 10-198841 | 7/1998 |
| JP | 11-096252 A * | 4/1999 |
| JP | 11-338942 | 12/1999 |
| JP | 2000-194770 | 7/2000 |
| WO | 97/45814 | 12/1997 |
| WO | 00/67448 | 11/2000 |

OTHER PUBLICATIONS

Rigdon, J.I., "VeriFone's Box Lets Phones Act Like Private ATMs for Digital Cash Cards," Wall Street Journal (Eastern edition), Sep. 30, 1996, p. B8.*

Anon., "DealTime Goes Mobile," Online Reporter, May 15, 2000.*

Naik, G., et al., "M-Commerce: Mobile and Multiplying—Overseas, Mobile Phones Work Like Electronic Wallets; Bank Buy Wine, Pay Rent," Wall Street Journal (Eastern edition), Aug. 18, 2000, p. B1.*

* cited by examiner

FIG. 10

ORDER PRODUCT LIST
Select paid product

All products

| ○○○○ | ¥ 9800 | A company |
| △△△△ | ¥ 3690 | A company |
| □□□□ | ¥ 12800 | B company |
| ××××  | ¥ 59800 | C company |

FIG. 11

Confirm

[Confirm]  CONFIRM  [Cancel]

Total amount ¥86090 (Service fee ¥000))

| ○○○○ | ¥ 9800 | A Company |
| D bank E branch | Saving account 000000 | |
| △△△△ | ¥ 3690 | A Company |
| D bank E branch | Saving account 000000 | |
| □□□□ | ¥ 12800 | B Company |
| D bank G branch | Saving account 000000 | |
| ×××× | ¥ 59800 | C Company |
| H bank J branch | Saving account 000000 | |

NET SHOPPING METHOD, SYSTEM THEREFOR, AND AUTOMATIC PAYMENT TRANSFER DEVICE

BACKGROUND OF THE INVENTION

1. Field of the Invention

The present invention relates to a Net shopping method for shopping on the Internet using a portable terminal, a system therefor, and an automatic payment transfer device, and more particularly to a Net shopping method, system therefor, and an automatic payment transfer device for realizing safe and simple Net shopping.

2. Description of the Related Art

The development of portable terminals in recent years has been outstanding; because these can be connected to the Internet and exchange a wide variety of information, portable terminals are becoming widely disseminated as terminals for personal use. In addition, the Internet has developed from simple means for acquiring information into means for conducting transactions with a broad range of uses, such as shopping.

In this type of Net shopping using a portable terminal, payments for shopping are absolutely necessary. The following types of method are used for this purpose.

(1) Net payments wherein the portable terminal and shopping site exchange cash access information such as a credit card numbers and account numbers through the Internet during Net shopping.

(2) Shopping takes place on the Internet with the portable terminal, but the payment is made in cash at the nearest convenience store, for example, or is collected on delivery.

(3) Shopping takes place on the Internet with the portable terminal, but the payment is made by a bank account transfer.

However, the method in (1) has some problems in that the cash access information may be stolen and misused by a third party because the cash access information is exchanged through an open network. Security is being developed for this purpose, but it is difficult to prevent wiretapping and analysis operations.

Also, the methods in (2) and (3) have no risk of cash access information being stolen or fraudulently used on the Net because the payment is made separately from the Net, although the shopping takes place easily through the Internet. However, these methods have the problem that the settlement actions are troublesome for the user and become an obstacle to the ease of Internet shopping because the cash settlement is not linked to data on the Internet. For example, with cash on delivery, the user must prepare the cash in advance and be present to receive the shipment at home or the like. Also, in the case of a payment transfer, the transfer destination must be entered on the Net and the user must write the transfer destination of the Net on the transfer request sheet and make a transfer request based on this information.

SUMMARY OF THE INVENTION

It is an object of the present invention to provide a Net shopping method for realizing safe and simple Net shopping, a system therefor, and an automatic payment transfer device.

It is another object of the present invention to provide a Net shopping method for making payment procedures in Net shopping safe and simple, a system therefor, and an automatic payment transfer device.

In order to achieve these objects, the Net shopping method relating to the present invention comprises: a step for performing Net shopping through the Internet with the portable terminal and storing the order acceptance data in the memory of the portable terminal; a step for transferring the abovementioned order acceptance data from the abovementioned portable terminal to an automatic payment transfer device of a financial system; a step for performing payment transfer operation with said payment transfer device; and a step for transfer processing using the contents of the operation and the order acceptance data with the financial system.

The Net shopping system relating to the present invention comprises a server for hosting the Net shopping site and sending order acceptance data to a portable terminal corresponding to the Net shopping through the Internet from the portable terminal; an automatic payment transfer device for receiving the abovementioned order acceptance data from the abovementioned portable terminal and sending payment transfer data in accord with payment transfer operations based on the abovementioned order acceptance data of the abovementioned user; and a host computer for receiving the payment transfer data of the abovementioned automatic payment transfer device and performing payment transfer processing.

The automatic payment transfer device relating to the present invention comprises operation guidance unit for guiding the payment transfer operations of the user and carrying out the payment transfer operations of the user; and a control unit for receiving the order acceptance data corresponding to the Net shopping from the portable terminal, providing the payment transfer operation guidance based on the abovementioned order acceptance data, and sending the payment transfer data according to the user's payment transfer operations through a dedicated line to a host computer for performing the payment transfer processing.

With the present invention, the user freely makes product selections (Net shopping) at any time and place using a portable terminal. When the user proposes to conduct a transaction, order acceptance data (transaction proposal information, payee information, the amount of money) is sent from the server to the portable terminal and stored in the internal memory thereof. Next, the user takes the portable terminal to the automatic payment transfer device and transfers the data in the portable terminal to the automatic payment transfer device. The user performs payment transfer operations based on the order acceptance data with the automatic payment transfer device and the payment transfer process is performed with a safe and convenient financial system. For this reason, the payment transfer process can be performed safely. When the payment transfer process is finished in the financial system, the vendor is notified that the payment transfer (settlement) is complete and therefore the Net shopping settlement for the vendor and user is finished. The user can therefore easily and safely make payments for easy Net shopping. Safe and easy Net shopping can thereby be realized.

Also, in the Net shopping method relating to the present invention, the abovementioned storage step preferably comprises a step for accessing the Net shopping site hosted by the server through the abovementioned Internet from the abovementioned portable terminal and sending product order data to the abovementioned server; and a step for sending order acceptance data corresponding to the abovementioned product order from the abovementioned server to the abovementioned portable terminal and storing the abovementioned order acceptance data in the memory of the portable terminal.

In the Net shopping system relating to the present invention, the abovementioned server receives the product order data corresponding to the access of the abovementioned Net shopping site through the abovementioned Internet from the abovementioned portable terminal, and sends order data corresponding to the abovementioned product order through the abovementioned Internet to the abovementioned portable terminal. Conventional Net shopping can thereby be realized without much change.

In the Net shopping system relating to the present invention, the abovementioned sending step preferably comprises a step for sending the abovementioned order acceptance data including the payee information for the abovementioned ordered product. In the Net shopping system relating to the present invention, the abovementioned server preferably sends the abovementioned order acceptance data including the payee information for the abovementioned ordered product to the abovementioned portable terminal. Because the payee information is thereby transferred, the payment transfer operations can be made simply with an automatic payment transfer device for products ordered from any shopping site.

In the Net shopping method relating to the present invention, the abovementioned payment transfer processing step preferably comprises a step for providing payment transfer operation guidance with the abovementioned automatic payment transfer device based on the abovementioned order acceptance data and sending the payment transfer data according to the user's payment transfer operations through a dedicated line to a host computer of the abovementioned financial system; and a step for performing the payment transfer processing of the abovementioned payment transferred data with the abovementioned host computer and notifying the abovementioned payee.

In the Net shopping system relating to the present invention, the abovementioned automatic payment transfer device provides payment transfer operation guidance based on the abovementioned order acceptance data and sends the payment transfer data according to the user's payment transfer operations through a dedicated line to the abovementioned host computer. The abovementioned host computer performs the payment transfer processing of the abovementioned payment transfer data and notifies the abovementioned payee. In the automatic payment transfer device relating to the present invention, the abovementioned control unit preferably receives the abovementioned order acceptance data from the abovementioned portable terminal, displays the abovementioned order acceptance contents, causes the contents of the payment transfer to be input, and generates the abovementioned payment transfer data.

An automatic payment transfer processing system can thereby be realized without major changes to a conventional system.

BRIEF DESCRIPTION OF THE DRAWINGS

FIG. 10 is a drawing to explain the order data display screen of the automatic payment transfer device in FIG. 6; and FIG. 11 is a drawing to explain the payment transfer confirmation screen of the automatic payment transfer device in FIG. 6.

DESCRIPTION OF THE PREFERRED EMBODIMENTS

The embodiments of the present invention are explained below in the following order: Net shopping system, automatic payment-transfer device, and other embodiments.

Net Shopping System

Figure 1:
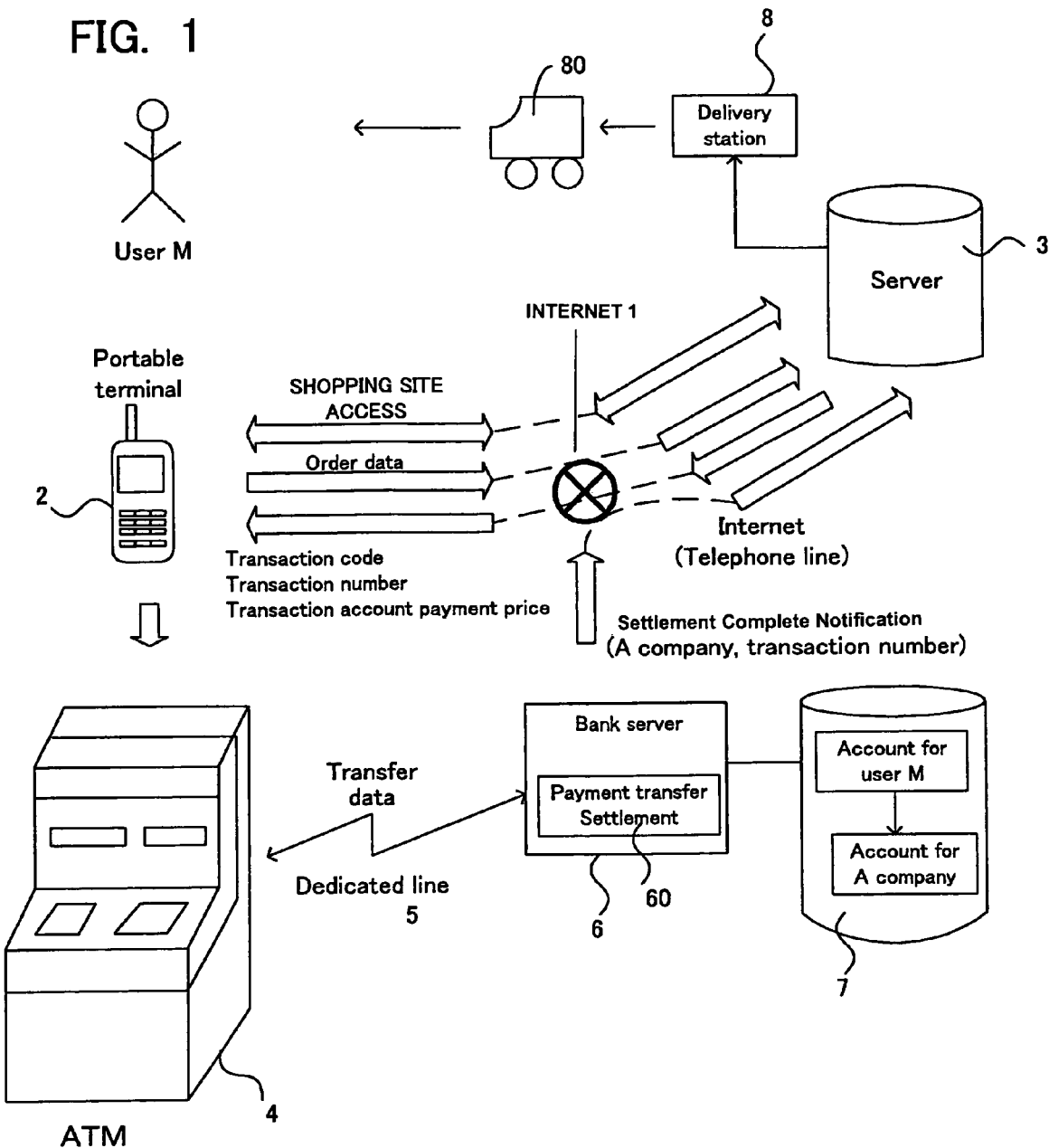
FIG. 1 shows the configuration the system relating to an embodiment of the present invention.
Figure 2:
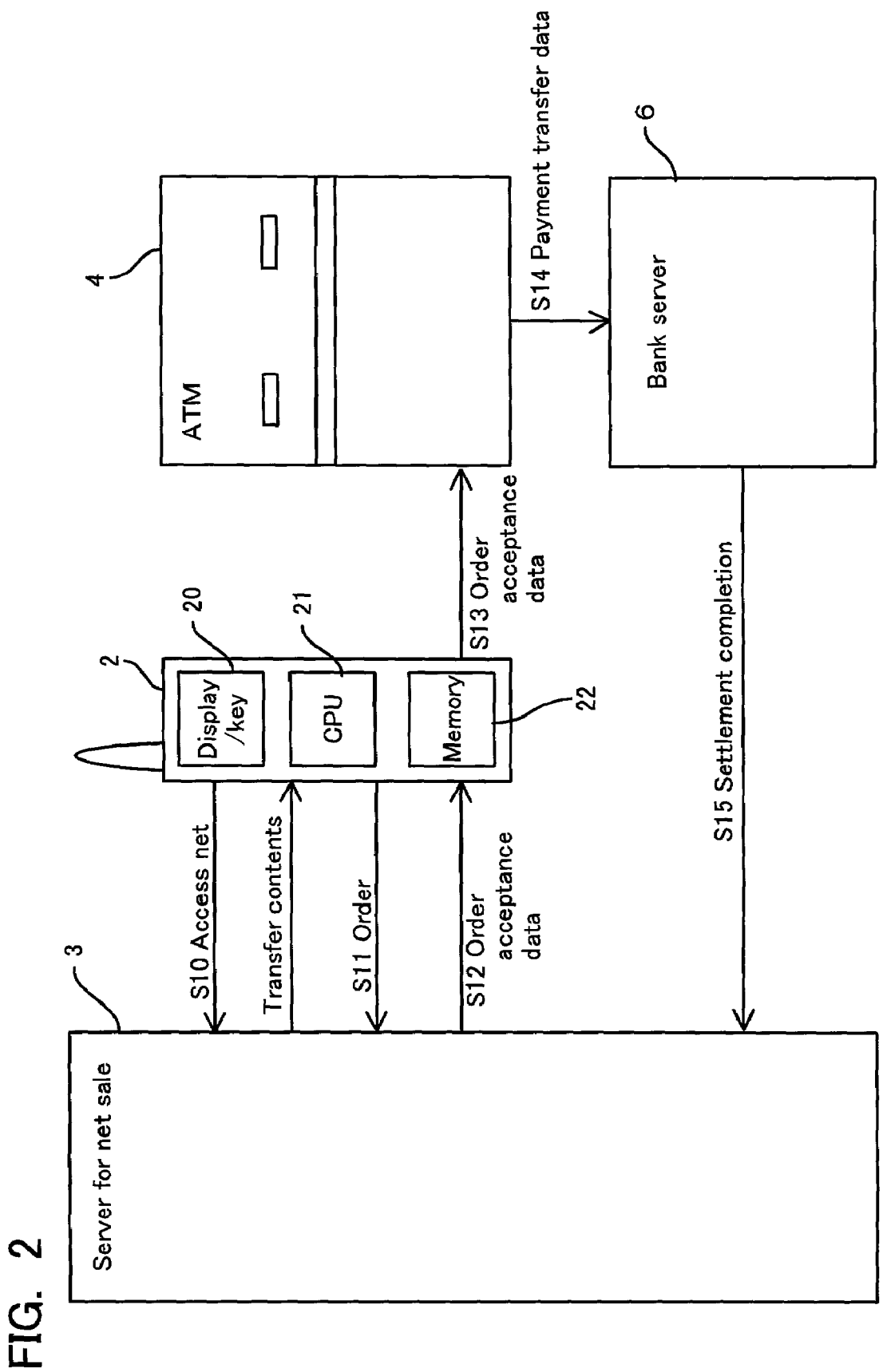
FIG. 2 shows the processing flow for the system in FIG. 1.
Figure 3:
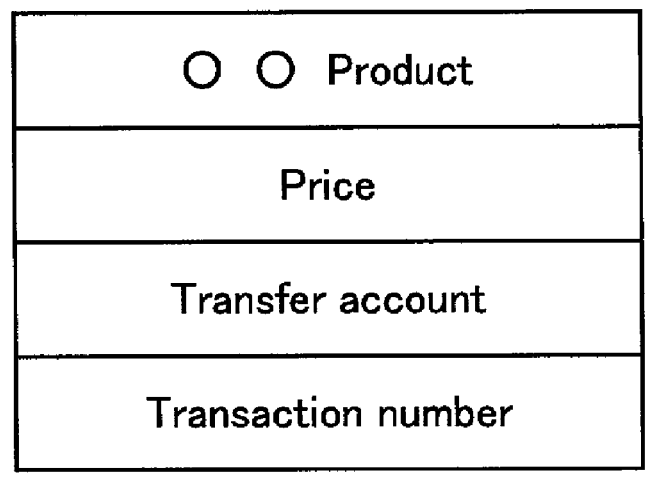
FIG. 3 is a drawing to explain the order acceptance data in FIG. 1.
Figure 4:
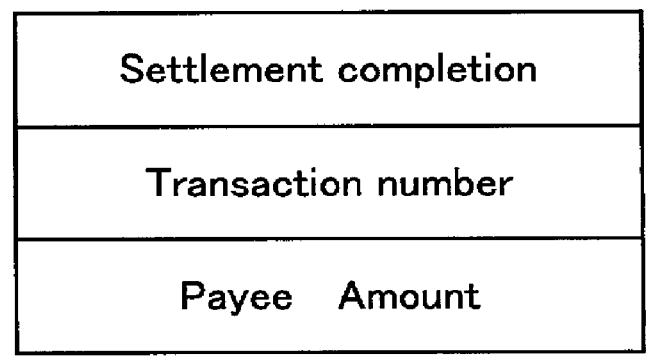
FIG. 4 is a drawing to explain the notification of completed payment in FIG. 1.

FIG. 1 shows the configuration of the Net shopping system relating to the embodiment of the present invention; FIG. 2 shows the processing sequence thereof; FIG. 3 is a drawing to explain the transaction data thereof; and FIG. 4 is a drawing to explain the notification of completed payment.

As shown in FIG. 1, the Internet 1 is constituted with public lines and dedicated lines. The http Internet protocol, the most widely used because of the dissemination of the World Wide Web on the Internet, is used as the protocol on the Internet 1. Generally, for reasons of security, internal company networks are separated from the external Internet environment by mechanism called a firewall. For this reason, access from the Internal company network to the external internet 1 or in the other direction cannot usually be performed with many Internet protocols. On the other hand, in the http protocol, a safety mechanism through a firewall is used by many companies. In many respects, this is because of the diffusion of the World wide Web.

The server 3 is a processing unit for hosting Net shopping sites. The portable terminal 2 is constituted with a portable (or cellular) telephone in this example having a display/key 20, CPU 21 and memory 22; the user M carries the telephone and accesses the shopping site on the server 3 through the Internet 1. The user does this by inputting the URL for the Internet site; it is also possible to use the "I-Mode" (trade name) menu provided by NTT DoCoMo. The portable terminal 2 may also be a PDA (personal digital assistant).

The ATM (automatic teller machine) 4 minimally performs payment transfer processing according to user operations. The ATM 4 may also have functions for making payments and deposits. As discussed below, this ATM 4 has an interface with the portable terminal 2. The ATM 4 is established at one of several exemplary locations such as bank branches, post offices, and convenience stores.

This ATM 4 is connected to a bank's host computer (hereinafter called "bank server") 6 through the dedicated line 5. The bank server 6 performs financial processes such as deposits, payments, and payment transfers. The bank account database file 7 contains deposit data and the like for each account. This bank server 6 performs payment transfer settlement processing 60 for updating the bank account database file 7 according to the payment transfer data from the ATM 4.

The delivery station 8 houses products or the like and ships the products as instructed by the server 3. The products shipped are delivered to the user M on a truck 80 or the like.

The Net shopping process according to FIG. 2 is explained with reference to FIGS. 3 and 4.

(S10) The user accesses the Net shopping site on server 3 through the Internet 1 from the portable terminal 2, fetches the site contents, and displays the contents on the display/key unit 20. When the portable terminal 2 is a portable telephone, the terminal accesses the shopping site with the "i-Mode" menu or URL input, as is known.

(S11) The user orders the product with the display/key 20 of the portable terminal 2. In other words, the user indicates the product with the display/key 20 and sends the order data (product data, user data, etc.) to the server 3 through the Internet 1.

(S12) The server 3 receives the order data, confirms the order, and sends the order acceptance data to the portable terminal 2. When storing the data in the memory 22, the portable terminal 2 displays the data on the display/key 20. As shown in FIG. 3, the order acceptance data comprises the product name, product code, price, transfer account information (account number, account holder name, etc.), communication number (order acceptance number, transaction code, etc.), and so forth. Also, the user may be required to confirm the order acceptance.

(S13) The user takes the portable terminal 2 and cash or a card to the location of the ATM 4. As discussed below, the ATM 4 is provided an interface with the portable terminal 2. The user connects the portable terminal 2 to the ATM 4 and inputs the order acceptance data in the memory 22 of the portable terminal 2 to the ATM 4. The user then uses the order acceptance data and performs the payment transfer operations on the ATM 4.

(S14) ATM 4 sends the payment transfer data according to the payment transfer operations through the dedicated line 5 to the bank server 6. As is generally known, the bank server 6 receives the payment transfer data and according to the payment transfer process 60, moves electronic money from the user M's account in the account database 7 to the account of the vendor A. Or, the bank server moves the payment transfer amount to the account of the vendor A.

(S15) When the transfer process is complete, that bank server 6 notifies the vendor server 3 of the completed payment through the Internet 1 or a dedicated line. As shown in FIG. 4, the notification of settlement includes the completed payment, the abovementioned communication number (order acceptance number), the name of the payer, the amount of money, and so forth. The vendor server 3 confirms the notification of completed payment and, as shown in FIG. 1, instructs the delivery station 8 to ship the product. The product shipped is delivered to the receiving site of the user M (residence, workplace, convenience store, etc.) by a truck 80 or the like.

In this way, the user uses the portable terminal 2 to freely select products (Net shopping) at any time or place. When the user proposes to conduct a transaction, the user causes the portable terminal 2 to store the transaction proposal information, payee information, and the amount of money to the internal memory 22.

Next, the user takes the portable terminal 2 to the ATM 4, connects the portable terminal 2 to the ATM 4, sends the internal data to the ATM 4, operates the ATM 4, and makes a payment with cash or a card. At this time, since the order acceptance data is transferred to the ATM 4, the payment transfer operation can be carried out based on the order acceptance data and the payment transfer operation can be performed with a simple operation. Also, because the ATM 4 is connected to a financial system, the payment transfer process can be performed safely. Because the vendor is notified of the payment transfer (settlement) completion when the payment transfer process is completed by the financial system, the settlement for the Net shopping by the vendor and user is complete.

For this reason, the user can safely and easily make settlement for easy Net shopping. A safe and easy Net shopping experience can thereby be provided.

Moreover, the portable terminal 2 was explained with a portable telephone, but a portable information terminal (such as a PDA) can also be used. Also, the financial system was explained with a banking system, but this can also be applied to the online system of the post office, or the like. Furthermore, the payment transfer terminal was explained with an ATM, but a multimedia terminal, or the like, having payment transfer functions can also be used. Net shopping may also include auctions or the like.

Automatic Payment Transfer Device

Figure 5:
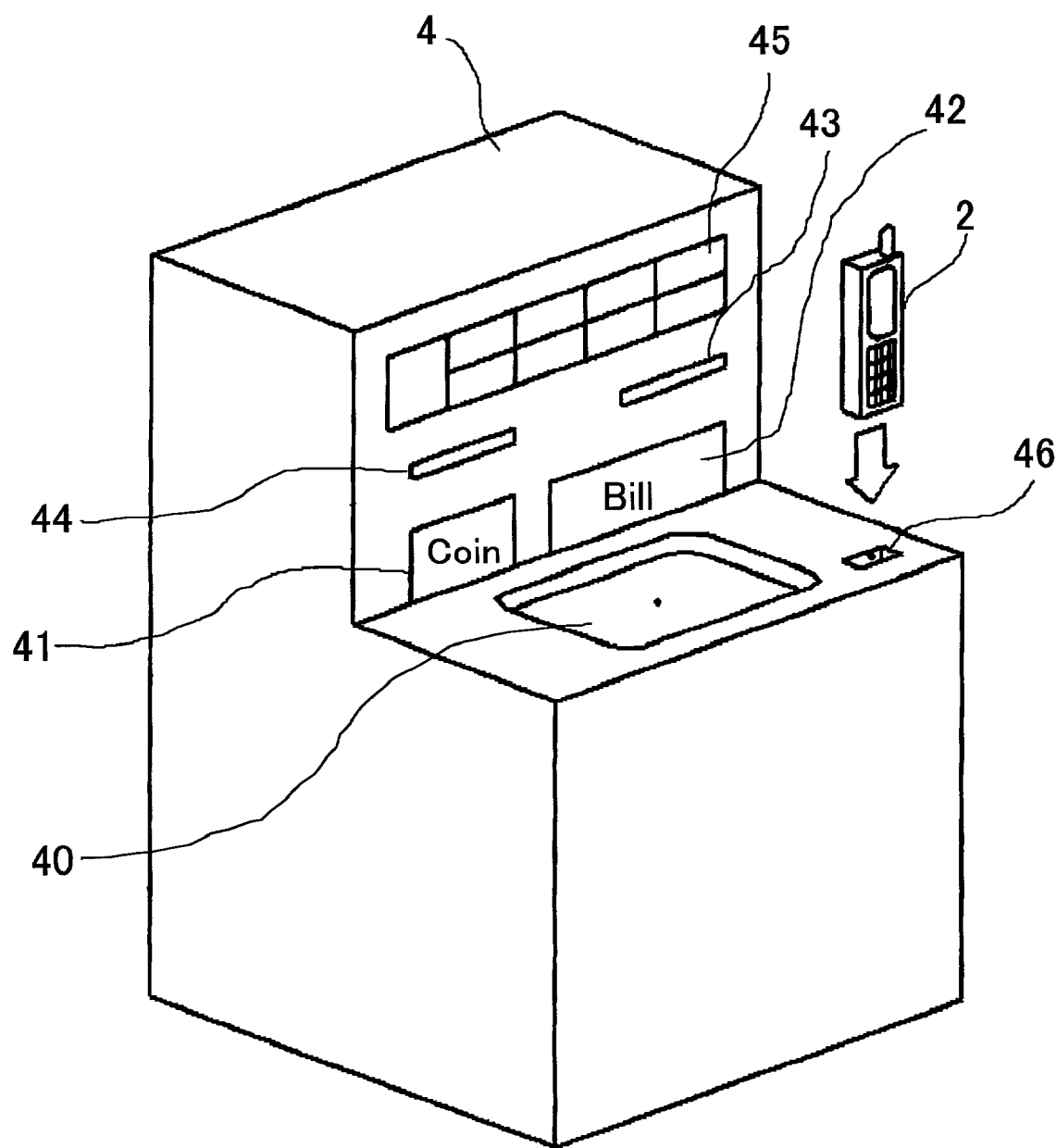
FIG. 5 shows an external view of the automatic payment transfer device in FIG. 1.
Figure 6:
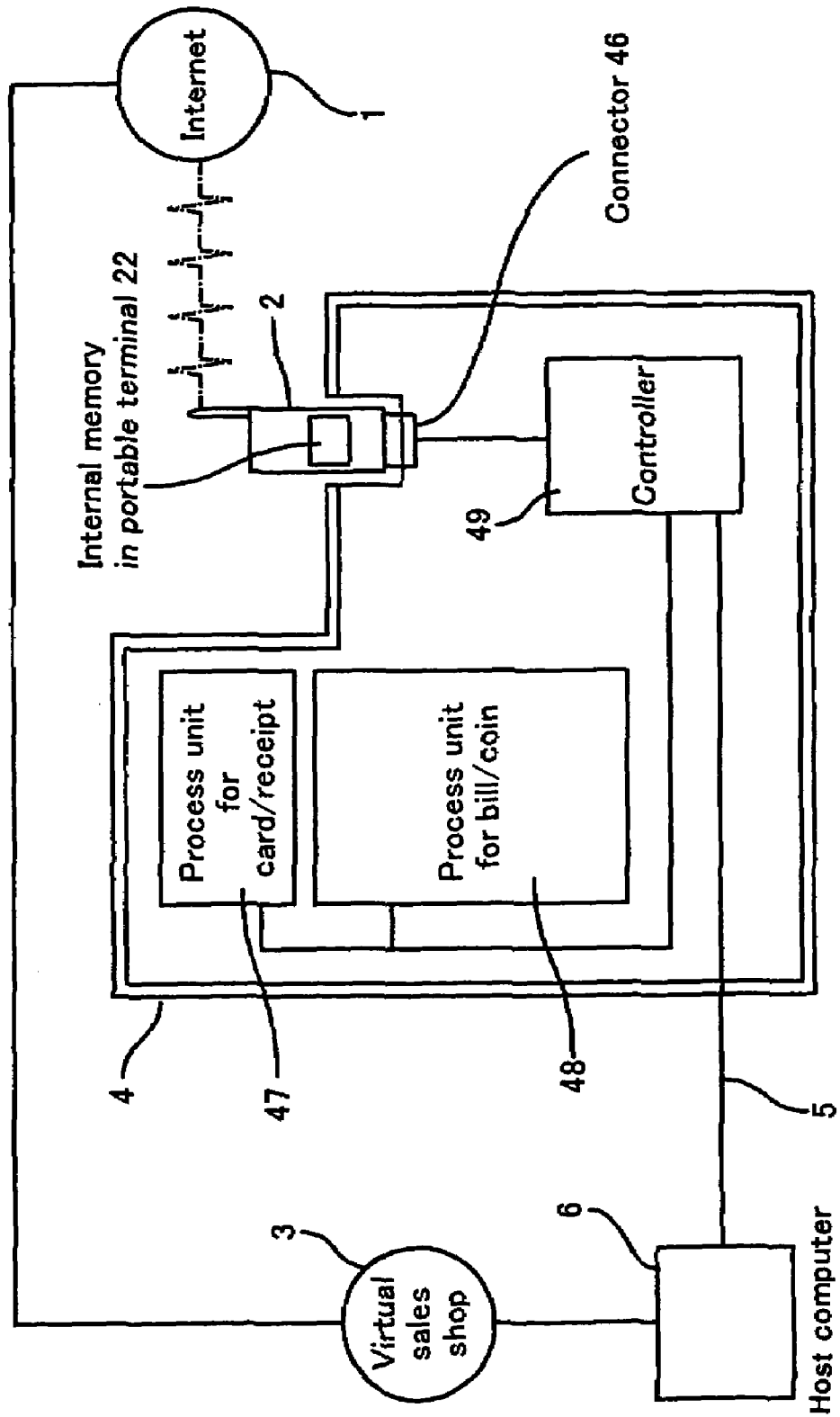
FIG. 6 is a block diagram of the automatic payment transfer device in FIG. 5.
Figure 7:
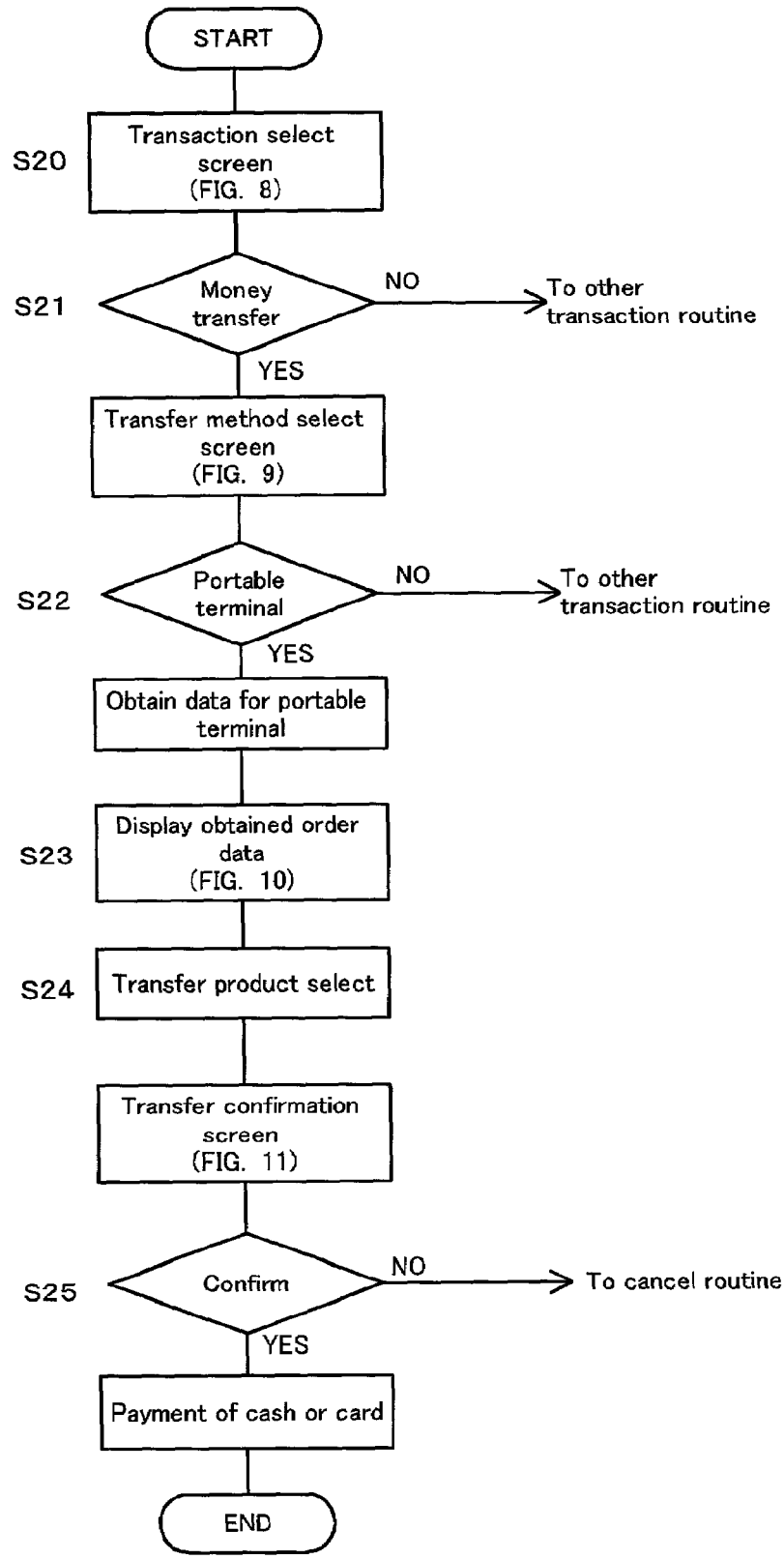
FIG. 7 shows the processing flow for the automatic payment transfer device in FIG. 6.

The automatic payment transfer device 4 for such a portable terminal 2 is explained next using FIGS. 5 through 11. FIG. 5 shows an external view of the ATM (payment transfer device) 4 in FIG. 1; FIG. 6 shows a block diagram thereof; FIG. 7 shows the processing flow thereof; and FIGS. 8 through 11 are drawings explaining the guidance screens thereof.

As shown in FIG. 5, the automatic payment transfer device is constituted with an ATM 4 that can accept deposits, make payments, and transfer money. The ATM 4 comprises a display 40 with a touch key function, a coin input slot 41, a paper money input slot 42, a card/receipt insertion/return slot 43, a bankbook insertion/return slot 44, an instruction display device 45, and a portable terminal connecting portion (interface portion) 46.

As shown in FIG. 6, the ATM 4 comprises a media processing unit 47 for communicating with the card/receipt insertion/return slot 43 and the bankbook insertion/return slot 44 and for reading the card, issuing receipts, and making bankbook entries; a paper/coin money processing unit 48 connected to the paper/coin money insertion slots 41, 42 for processing the paper money and coins; a control portion 49 for controlling these and communicating with the host computer 6; and a connecting portion 46 connected to the control portion 49.

The connecting portion 46 comprises an anchor portion such as a depression for anchoring the portable terminal 2 and connects the portable terminal 2 and the control portion 49 with either a contact (junction connector, etc.) or a non-contact (optical, wireless communication) connection. Moreover, the host computer 6 has a wired connection to the vendor server 3 and the portable terminal 2 may be connected to the vendor server 3 through the Internet 1 at any time.

The payment transfer process of the ATM 4 is explained next in FIG. 7 with reference to FIGS. 8 through 11.

Figure 8:
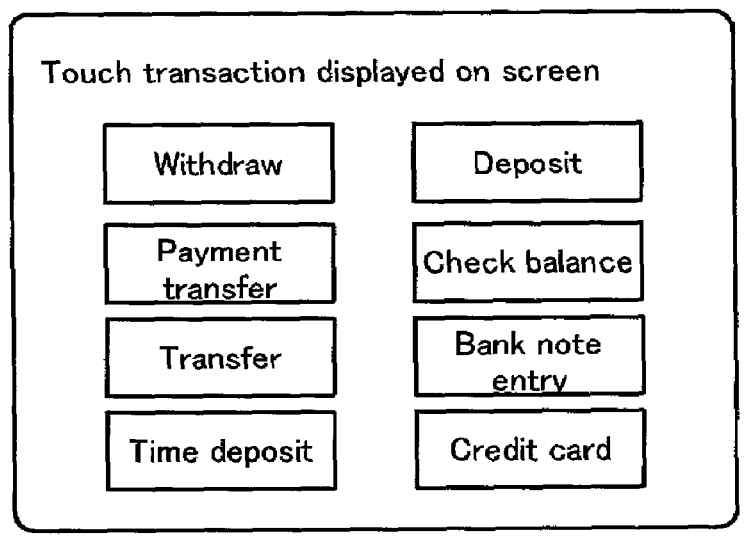
FIG. 8 is a drawing to explain the transaction selection screen of the automatic payment transfer device in FIG. 6.

(S20) A transaction selection screen as shown in FIG. 8 is displayed on the display 40. As shown in FIG. 8, the transaction selection screen displays selection icons and these can be selected with the touch key: "withdrawal", "deposit", "payment transfer", "check balance", "transfer", "bankbook entry", "time deposit", and "credit card" (loan).

Figure 9:
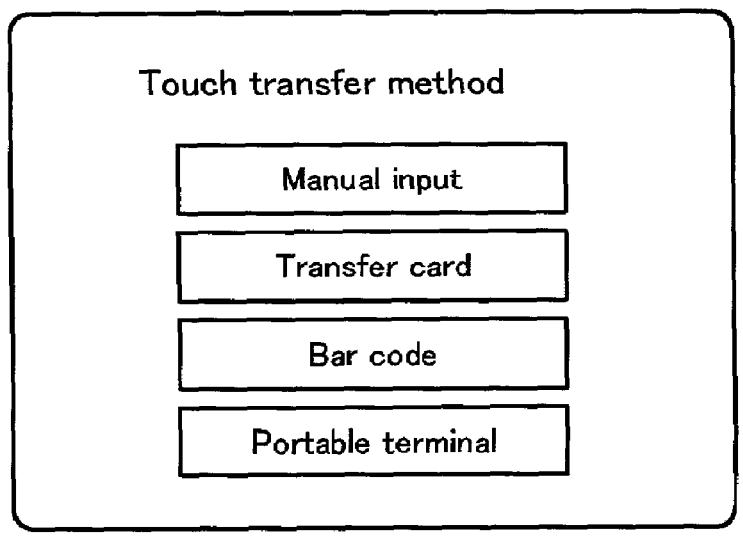
FIG. 9 is a drawing to explain the transfer method selection screen of the automatic payment transfer device in FIG. 6.

(S21) When "transfer" is selected, the input selection screen as shown in FIG. 9 is displayed. As shown in FIG. 9, the input selection screen is a screen for selecting the input method for the transfer. Selection icons such as the following are displayed and these can be selected with the touch key: "manual input" (input by keys), "transfer card" (input transfer card to which transfer information is stored), "bar code" (Input bar code for payee noted on a payment transaction slip or the like), "portable terminal" (input with the portable terminal).

(S22) When "portable terminal" is selected, an instruction screen is displayed for connecting the portable terminal, depending on the connection method. The user sets the portable terminal 2 in the connecting portion 46 and presses the send key (not shown) on the portable terminal 2, whereupon the order data in the memory 22 of the portable terminal 2 is sent to the control portion 49.

(S23) The control portion 49 receives (sucks up) the data sent and displays the contents of the uploaded order on the display 40 as shown in FIG. 10. In FIG. 10, the product name, amount of money, and vendor (payee name) are displayed and the paid product can be selected with the touch key. Also, everything can be selected with a select all icon.

(S24) The user selects the payment transfer product with the touch key on the display. The control portion 49 displays the payment transfer information for the selected product. For example, as shown in FIG. 11, this includes the product name, amount of money, vendor, payee account (bank name, branch name, account type, account number), the total amount, and a service charge. Furthermore, icons for selecting confirmation or cancellation are displayed. This transfer account information is part of the order data sent to the portable terminal 2 from the vendor server 3 during the abovementioned Net shopping.

(S25) Next, when the user presses the confirmation key, a payment transfer process with cash or a card is performed. This payment transfer process is a known method. For example, when a cash transfer is indicated, the insertion slots 41, 42 open and the user inserts cash, whereupon the cash processing unit 48 totals the money, the amount of money input is displayed, and the payment transfer operation is complete upon confirmation. If a card transfer is indicated, the user is instructed to insert his or her card. When the user inserts the card in the insertion slot 43, the processing unit 47 reads the card, confirms the user's ID, and confirms the account and transaction amount, whereupon the transfer operation is complete. Accordingly, the control portion 49 sends the payment transfer data (transfer source, transfer destination, amount of money, order number, etc.) to the host computer 6 on the dedicated line 5.

As discussed above, the host computer 6 receives the payment transfer data and performs, by means of payment transfer settlement processing 60, a fund transfer from M's account to the vendor A's account in the account database 7, or moves the transfer amount to the vendor A account. When the transfer process is finished, the host computer 6 sends a settlement notification (including completed payment, the abovementioned communication number (order acceptance number), payer name, and amount of money) to the vendor server 3 through the Internet 1 or the dedicated line. The vendor server 3 confirms the notification of completed payment and as shown in FIG. 1, instructs the delivery station 8 to ship the item. The item shipped is delivered by a truck 80 or the like to the user M's receiving site (residence, workplace, convenience store, etc.).

In this way, the user freely makes product selections (Net shopping) at any time and place using the portable terminal 2. When the user proposes to conduct a transaction, the user stores transaction proposal information, payee information, and the amount of money in the internal memory 22 of the portable terminal 2.

Next, the user takes the portable terminal 2 to the ATM 4, connects the portable terminal 2 to the ATM 4, and transfers the internal data to the ATM 4. The user operates the ATM 4 and makes a payment with cash or a card. At this time, as explained with FIGS. 7 and 9, because the transfer mode of the portable terminal 2 is established in the ATM 4, the payment transfer operations can be performed based on the order acceptance data and the payment transfer can be made with a simple operation. Also, the ATM 4 is incorporated into a financial system and therefore the payment transfer process can be performed safely. When the payment transfer process is finished in the financial system, the vendor is notified that the payment transfer (settlement) is complete and therefore the Net shopping settlement for the vendor and user is finished.

In this way, the user can therefore easily and safely make payments for easy Net shopping. Safe and easy Net shopping can thereby be realized.

Other Embodiments

In the embodiment discussed above, an example of payment transfer with cash or a deposit card was explained, however it is also possible to transfer money with a credit card, IC card (electronic money), or a prepaid card. Also, the payment transfer device was explained with an ATM, but may also be an automatic device having the necessary payment transfer function, such as a transfer-dedicated device. Furthermore, the portable terminal is not limited to a portable telephone and a portable information terminal such as a PDA may also be used.

The present invention was explained above using an embodiment, but the present invention may be modified in various ways within the scope of the invention and these do not fall outside the technical scope of the present invention.

(1) The user freely makes product selections (Net shopping) at any time and place using the portable terminal 2. When the user proposes to conduct a transaction, transaction proposal information, payee information, and the amount of money are automatically stored from the Net shopping site into the internal memory 22 of the portable terminal 2. Next, the user takes the portable terminal 2 to the automatic payment transfer device 4, connects the portable terminal 2 to the payment transfer device 4, and transfers the internal data to the payment transfer device 4. The user operates the payment transfer device 4 and makes a payment based on the order acceptance data; as a result, the payment transfer process can be performed safely and with a simple operation.

(2) When the payment transfer process is finished in the financial system, the vendor is notified that the payment transfer (settlement) is complete and therefore the Net shopping settlement for the vendor and user is finished. In this way, the user can therefore easily and safely make payments for easy Net shopping. Safe and easy Net shopping can thereby be provided.

What is claimed is:

1. A Net shopping method, comprising:
performing Net shopping through the Internet employing a portable terminal to place a product order and storing order acceptance data corresponding to the order in a memory of the portable terminal;

transferring said order acceptance data from said portable terminal to an automatic payment transfer device of a financial system upon the portable terminal being connected via an interface to the automatic payment transfer device at a location of the automatic payment transfer device;

operating said automatic payment transfer device to perform payment transfer operations; and performing payment transfer processing using contents of said payment transfer operations and said order acceptance data with said financial system, wherein:

said operating said automatic payment transfer device comprises providing payment transfer operation guidance by said automatic payment transfer device that performs payment transfer process according to an operation of said payment transfer by a user, said payment transfer operation guidance including a selection menu by which a user selects payment transfer by the portable terminal, and sending the payment transfer data according to the payment transfer operations and said transferred order acceptance data through a dedicated line to a host computer of said financial system, and said performing payment transfer processing comprises performing the payment transfer processing of said payment transfer data by said host computer.

2. The Net shopping method according to claim 1, wherein said performing Net shopping comprises:

accessing a Net shopping site hosted by a server through said Internet from said portable terminal;

sending product order data to said server; and sending order acceptance data, corresponding to said product order, from said server to said portable terminal and storing said order acceptance data in a memory of the portable terminal.

3. The Net shopping method according to claim 2, wherein said sending order acceptance data comprises sending said order acceptance data including payee information for said ordered product.

4. The Net shopping method, according to claim 1, wherein said transferring comprises transferring said order acceptance data from said portable terminal to the automatic payment transfer device of the financial system in response to the pressing of a send key of said portable terminal.

5. A Net shopping method, comprising:

performing Net shopping through the Internet employing a portable terminal to place a product order and storing order acceptance data corresponding to the order in a memory of the portable terminal;

transferring said order acceptance data from said portable terminal to an automatic payment transfer device of a financial system upon the portable terminal being connected via an interface to the automatic payment transfer device at a location of the automatic payment transfer device; and operating said payment transfer processing using contents of said payment transfer operations and said order acceptance data with said financial system, wherein:

said operating said automatic payment transfer device comprises providing payment transfer operation guidance by said automatic payment transfer device that performs payment transfer process according to an operation of said payment transfer by a user, said payment transfer operation guidance including a selection menu by which a user selects payment transfer by the portable terminal, and sending the payment transfer data according to the payment transfer operations and said transferred order acceptance data through a dedicated line to a host computer of said financial system, and said performing payment transfer processing comprises performing the payment transfer processing of said payment transfer data by said host computer and notifying a payee.

6. The Net shopping method, according to claim 5, wherein said operating said payment transfer device comprises:

receiving said order acceptance data from said portable terminal;

displaying said order acceptance data; and prompting a user to input the payment transfer contents to generate said payment transfer data.

7. A Net shopping system comprising:

a server hosting a Net shopping site and sending order acceptance data to a portable terminal, corresponding to Net shopping ordered through the Internet from said portable terminal by a user;

an automatic payment transfer device receiving said order acceptance data from said portable terminal and sending payment transfer data according to payment transfer operations based on said order acceptance data of a user; and a host computer connected to said automatic payment transfer device and receiving the payment transfer data from said automatic payment transfer device and performing payment transfer processing, wherein:

said automatic payment transfer device provides payment transfer operation guidance, said payment transfer operation guidance including a selection menu by which a user selects payment transfer by the portable terminal, and sends the payment transfer data according to payment transfer operations carried out by the user and said received order acceptance data through a dedicated line to said host computer, said host computer performs the payment transfer processing of said payment transfer data, and said automatic payment transfer device has an interface communicating with said portable terminal at a location of the automatic payment transfer device.

8. The Net shopping system, according to claim 7, wherein said server receives the product order data corresponding to the access to said Net shopping site through said Internet from said portable terminal, and sends order acceptance data corresponding to said product order through said Internet to said portable terminal.

9. The Net shopping system, according to claim 8, wherein said server sends said order acceptance data, including payee information for said ordered product, to said portable terminal.

10. The Net shopping system, according to claim 7, wherein said automatic payment transfer device receives said order acceptance data, from said portable terminal in response to the pressing of a send key of said portable terminal.

11. A Net shopping system, comprising:

a server hosting a Net shopping site and sending order acceptance data to a portable terminal, corresponding to Net shopping ordered through the Internet from said portable terminal;

an automatic payment transfer device receiving said order acceptance data from said portable terminal and sending payment transfer data according to payment transfer operations based on said order acceptance data of a user; and a host computer connected to said automatic payment transfer device and receiving the payment transfer data from said automatic payment transfer device and performing payment transfer processing, wherein:

said automatic payment transfer device provides payment transfer operation guidance, said payment transfer operation guidance including a selection menu by which a user selects payment transfer by the portable terminal, and sends the payment transfer data according to the users payment transfer operations and said order acceptance data through a dedicated line to said host computer, said host computer performs the payment transfer processing of said payment transfer data and notifies a payee, and said automatic payment transfer device has an interface communicating with said portable terminal at a location of the automatic payment transfer device.

12. The Net shopping system, according to claim 11, wherein said automatic payment transfer device receives said order acceptance data from said portable terminal, displays said order acceptance data, prompts the user to input the payment contents, and generates said payment transfer data.

13. An automatic payment transfer device, comprising:

operation guidance means for guiding payment transfer operations of a user and carrying out the payment transfer operations of the user;

a control unit receiving order acceptance data according to a shopping session conducted over the internet from a portable terminal, providing the payment transfer operation guidance, said payment transfer operation guidance including a selection menu by which a user selects payment transfer by the portable terminal, and sending payment transfer data through a dedicated line according to the user's payment transfer operations and said received order acceptance data to a host computer for performing a payment transfer process; and an interface communicating with said portable terminal at a location of the automatic payment transfer device.

14. The automatic payment transfer device, according to claim 13, wherein said control unit receives said order acceptance data from said portable terminal, displays said order acceptance data, prompts the user to input transfer contents, and generates said payment transferred data.

15. The automatic payment transfer device, according to claim 13, further comprising a connecting portion for connecting with said portable terminal.

16. The automatic payment transfer device, according to claim 15, wherein said connecting portion comprises a housing portion for housing said portable terminal.

17. The automatic payment transfer device, according to claim 13, wherein said control unit displays said received order acceptance data on the operation guidance portion so that a subject of said payment transfer is selected.

18. The automatic payment transfer device, according to claim 13, wherein said control unit displays a screen for selecting a method of said payment transfer; receives the order acceptance data according to the shopping session conducted over the internet from the portable terminal when said portable terminal is indicated as said payment transfer method; and performs payment transfer operations based on said order acceptance data.

19. A shopping payment method, comprising:

ordering through a mobile device a product offered for sale via a web site of a retailer and storing information regarding the order in the mobile device; and paying for the ordered product by physically connecting the mobile device to an automatic payment transfer device with the information regarding the order stored in the mobile device being transferred to the automatic payment transfer device, the information further transferred to a host computer for processing of a payment between a financial institution of a purchaser and the financial Institution of the retailer.

* * * * *

UNITED STATES PATENT AND TRADEMARK OFFICE
CERTIFICATE OF CORRECTION

PATENT NO.       : 7,319,978 B2
APPLICATION NO.  : 09/815052
DATED            : January 15, 2008
INVENTOR(S)      : Hayato Minamishin et al.

Page 1 of 1

It is certified that error appears in the above-identified patent and that said Letters Patent is hereby corrected as shown below:

Column 11, Line 13, change "users" to --user's--.

Column 12, Line 37, change "Institution" to --institution--.

Signed and Sealed this

Seventeenth Day of June, 2008

JON W. DUDAS
*Director of the United States Patent and Trademark Office*